United States Patent [19]
Naddell et al.

[11] Patent Number: 5,613,213
[45] Date of Patent: Mar. 18, 1997

[54] DETERMINING AND DISPLAYING AVAILABLE SERVICES FOR A COMMUNICATION UNIT

[75] Inventors: Marc C. Naddell, Schaumburg; Gary W. Grube, Palatine, both of Ill.

[73] Assignee: Motorola, Inc., Schaumburg, Ill.

[21] Appl. No.: 221,136

[22] Filed: Mar. 31, 1994

[51] Int. Cl.$^6$ .................................................. H04B 7/00
[52] U.S. Cl. .................. 455/54.1; 455/34.1; 455/154.2; 455/9; 379/59
[58] Field of Search ..................... 455/33.1, 53.1, 455/54.1, 54.2, 69, 56.1, 67.1, 33.4, 34.1, 185.1, 186.1, 154.2, 154.1, 34.2, 9; 379/59

[56] References Cited

U.S. PATENT DOCUMENTS

| | | | |
|---|---|---|---|
| 4,031,473 | 6/1977 | Mitarai | 455/154.2 |
| 4,876,738 | 10/1989 | Selby | 455/54.1 |
| 5,093,926 | 3/1992 | Sasuta | 455/34.1 |
| 5,119,502 | 6/1992 | Kallin et al. | 455/56.1 |
| 5,313,653 | 5/1994 | Sasuta | 455/54.2 |

*Primary Examiner*—Reinhard J. Eisenzopf
*Assistant Examiner*—Doris To
*Attorney, Agent, or Firm*—Susan L. Lukasik

[57] ABSTRACT

Information regarding available services from a RF communication system (101) is transmitted by the RF communication system on an RF communication resource (109). The information is received by at least one communication unit (108). The at least one communication unit (108) determines, from the information, the available services. The at least one communication unit (108) displays an indication of the available services on a display (206) for a user.

15 Claims, 2 Drawing Sheets

DETERMINING AND DISPLAYING AVAILABLE SERVICES FOR A COMMUNICATION UNIT

FIELD OF THE INVENTION

This invention relates to radio frequency communications, including but not limited to determination of available services in radio frequency (RF) communication systems.

BACKGROUND OF THE INVENTION

Radio frequency communication systems are becoming more common, and radio users are operating over larger geographic regions than they have in the past. Users on large private systems, where operational modes are normally preprogrammed, find operating their radio units outside of their normal operational area confusing, especially when they choose to operate with different options or with different talk groups. As well, many times these different options or services, such as telephone interconnect, group dispatch, and data operate over a vast number of sites with varying coverage areas. Private system radios are routinely preprogrammed with over 200 options. Users need a way to quickly sort through only the valid choices of sites and options when they operate their radio to choose a mode of operation.

Many radios subscribe to numerous systems. These systems offer a large variety of system features and/or services, such as user talk groups, E-mail, voice mail, phone interconnect service, emergency calls, emergency alarms, dispatcher communication, priority queuing, wide area coverage, status and messaging, circuit data, packet data, and private calling, to name a few. All systems may not offer all of these features, hence the various services tend to be listed on a menu for each radio with respect to the different system. It is not unlikely that a communication unit may leave the range or coverage area of a particular system, rendering the services from that system useless to the radio and the user. Consequently, when the user attempts to use his radio, he must scroll through information relating to systems to which he has no current access. When there are numerous systems and numerous services available to such a user, it is very frustrating and time consuming for that user to have to scroll through all possible information while trying to make selections. It is even more inefficient when those selections are not currently available to the user, and the user must make numerous choices before finding an available service.

Accordingly, there is a need for a method of determining available communication services and then displaying them in a more useful and efficient manner to a user.

DESCRIPTION OF A PREFERRED EMBODIMENT

Figure 1:
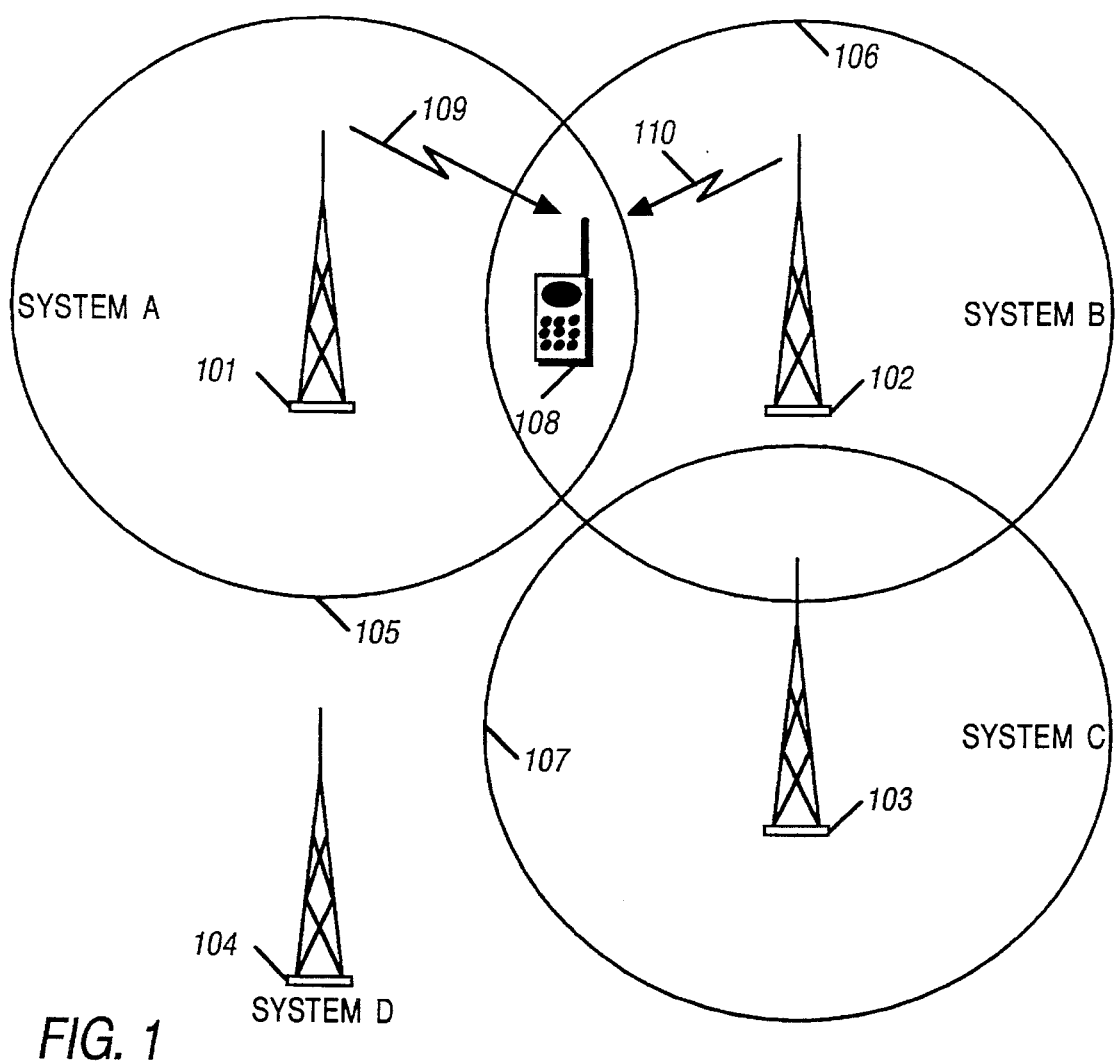
FIG. 1 is a block diagram of a plurality of communication systems in accordance with the invention.

The following describes an apparatus for and method of determining and displaying available services for a communication unit. The communication unit monitors RF communication resources for communication system activity. The communication unit interprets this activity and determines what services are currently available from any RF communication systems within range of the communication unit. The communication unit then displays an indication of the available services for the user to quickly view. The communication system activity may simply be any receivable activity on a resource known to be within a system, or the activity may be a transmission of information indicating what services are currently available in the communication system.

Information regarding available services from a RF communication system is transmitted by the RF communication system on an RF communication resource. The information is received by at least one communication unit. The at least one communication unit determines, from the information, the available services. The at least one communication unit displays an indication of the available services. The information is decoded such that individual status indicators for the available services are translated into data ready for display. Two or more radio frequency communication systems may transmit information regarding available services on one or more radio frequency communication resources.

In an alternative embodiment, information regarding available services from an RF communication system is transmitted by a radio frequency communication system on an RF communication resource. The RF communication resource is scanned for the information by at least one communication unit. The at least one communication unit determines, from the information, the available services. The at least one communication unit displays an indication of the available services. It is determined when to rescan the RF communication resource. The RF communication resource is rescanned for new information. The at least one communication unit determines, from the new information, new available services. The at least one communication unit displays an indication of the new available services. The available services are stored in the at least one communication unit. The new available services are stored in the at least one communication unit. The communication unit may wait a predetermined time between rescan steps. The predetermined time may be a function of how many radio frequency communication systems are to be scanned and/or current activity level in the RF communication system. Additionally, a user of the communication unit may indicate when a rescan is desired. Rescanning can be occur when the at least one communication unit is activated with a new service. In addition, two or more RF communication systems may transmit information regarding available services on one or more RF communication resources.

Alternatively, an RF communication resource sourced by a RF communication system is monitored. When activity is detected on the RF communication resource, a determination as made as to what services are associated with the RF communication system. An indication of the associated services is displayed. In addition, two or more RF communication systems may be monitored on one or more RF communication resources sourced by the two or more RF communication systems. Further, the one or more RF communication resources may be remonitored, it is determined if new available services are on-line that were not on-line during a previous monitoring step, and then the at least one communication unit displays an indication of the new available services.

A block diagram of a plurality of communication systems is shown in FIG. 1. System A has a base station controller 101 that covers a first service area 105. A base station controller is typically interfaced to a group of base stations (not shown) as is well known in the art. System A, via base station controller 101, transmits service information in a transmission 109 that may be received by a communication unit 108 (such as the one shown in FIG. 2) if it is in the first service area 105. System B has a base station controller 102 that covers a second service area 106. System B, via base station controller 102, transmits service information in a transmission 110 that may also be received by the communication unit 108 if that communication unit 108 is in the second service area 106. A third system, System C, is also in the general area of the communication unit 108. System C has a base station controller 103 that provides communications for a third service area 107. As is shown in the diagram, the communication unit 108 is not in the service area 107 of System C. Also shown in FIG. 1 is System D, which has a base station controller 104. This system is not registered in the communication unit's list of systems and services.

Figure 2:
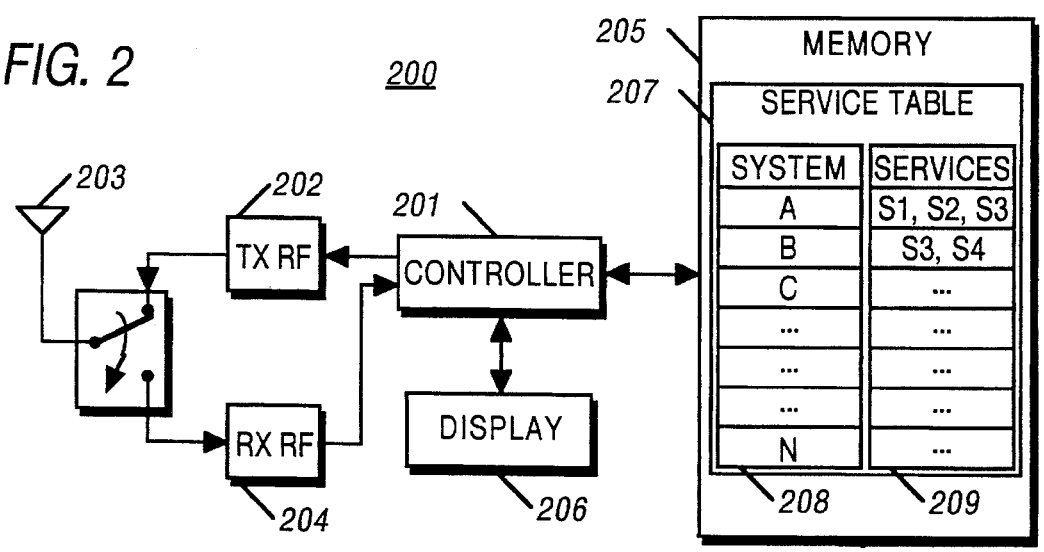
FIG. 2 is a communication unit in accordance with the invention.

A block diagram of a communication unit 200 is shown in FIG. 2. The communication unit 108 may be a Motorola SPECTRA radio, available from Motorola, Inc. A controller 201, such as a microprocessor or digital signal processor (DSP), is connected to both a transmitter 202 and a receiver 204 that are switchably coupled to an antenna 203. The controller 201 is also connected to memory 205. Within this memory 205 is stored a service table 207 that includes a list of systems 208 and a list of services 209 that are associated with and/or currently available through those systems. For example, System A offers services S1, S2, and S3, System B offers services S3 and S4, and System C does not currently offer any services to this communication unit 108 in its present location. In accordance with the invention, the services listed in this service table are those services that are currently available. Because the communication unit 108 is not in the coverage area of System C as shown in FIG. 1, there are no services listed in the service table for System C. In addition, System D does not appear in the table because the communication unit is not affiliated with System D, and hence cannot access its services.

In the preferred embodiment of the present invention, the service information transmitted on RF communications resources by each system includes an individual status indicator for each of the available services within the system. The individual status indicator includes information identifying a service or feature that is currently available in the system. In the preferred embodiment, the word "services" (or available services) refers to both services and features (or available services and available features) as a shorthand notation for both. The status indicators are transmitted periodically in a message on an RF communications resource known to the communication units. A system administrator or operator determines how often these indicators are transmitted, as most appropriately fits the needs of a particular system. When a communication unit 108 receives the message including the individual status indicators, it processes the information into data ready for display on the communication unit's 108 display 206.

Figure 3:
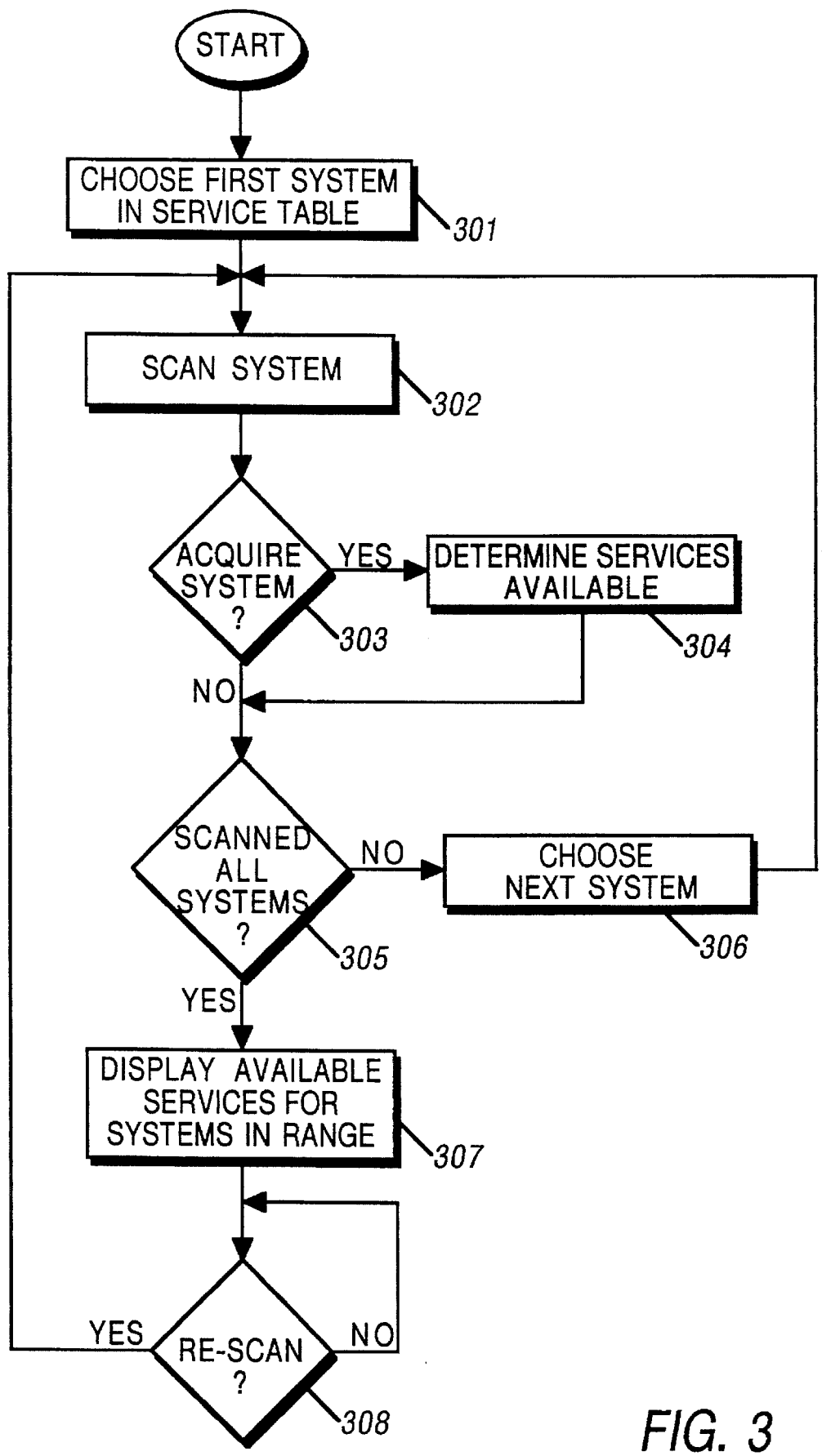
FIG. 3 is a flow chart showing integration of available services into a communication unit service table in accordance with the invention.

A flow chart showing integration of available services into a communication unit service table is shown in FIG. 3. At step 301, the communication unit first chooses a system in its service table 207. At step 302, the communication unit 108 scans that system for the available service information. If the communication unit 108 is out of range of that system, it will obviously not receive any service information and consequently will enter no information in the service table under available services. If any information is currently in the service table 207 for that system that is currently out of range, the services will be erased from the service table 207. At step 303, the unit determines if there is a new system to be acquired for its service table 207. If there is a new system, the process continues at step 304 where it determines what services are available from that system by scanning the frequency which may be transmitting that information. The available service information is then stored in the service table 207 within the communication unity's memory 205. If at step 303 there is no new system to acquire, the process continues with step 305.

If the unit has scanned all the systems in its table, then the process continues with step 307. If the communication unit 108 has not scanned all systems in its table, then it continues with step 306 where it choose the next system and continues with step 302. At step 307, the communication unit 108 displays the available services for systems in range. This may be done in a number of ways, including listing only those services that are available at the time to the communication unit 108 in the menus or alternatively highlighting only those available services in a suitable fashion, such as darkening available services or lightening unavailable services or placing a star or other such symbol next to available services such that a user may quickly scan through the list to find what services are available. Obviously, a list that includes only available services would be a shorter list and would take less time and hence be more efficient for a user. At step 308, the process may be started again at some later time to rescan all the systems; if it does, then the process continues with step 302. If there is no need to rescan at this time, the process continues at step 308.

Basically, the system described in FIG. 3 includes a situation where each base station controller transmits relevant information to the communication unit 108 that may be listening so that the unit may determine what the services are that are actually available to the system. In addition, the system may also transmit information such that it will only show current available services. In other words, a particular service may be out of current use because of some hardware problem such as, for example, a telephone interconnect may not be available because the telephone system is down at the moment for whatever reason. This information may be transmitted by the base station controller and received by communication unit 108 so that they may update their own service tables.

In an alternative embodiment, also reflected by FIG. 3, a communication unit 108 may monitor a radio frequency communication resource as sourced by a radio frequency communication system, as reflected in steps 301 and 302. When activity is detected on the RF communication resource, as reflected in step 303, the unit may then determine what services are associated with the RF communication system by looking in a table which it may have which merely sources the services that communication system offers, as reflected in step 304. The communication unit 108 may then display an indication of the associated services under the assumption that these are all available at the time, as reflected in step 307. If more than one RF communication system is available to the particular communication unit, that unit may monitor one or more of these communication systems by monitoring for any activity on the communication resources by that system, as reflected in steps 305 and 306. In this way, a communication unit 108 may determine if a system is within range by monitoring communication resources that it knows are associated with a particular system and as such does not require additional transmissions by a system for the unit to determine if that system is within its range or coverage area. In addition, a communication unit 108 may also remonitor these systems communication resources and may check if new available resources are on-line that were not on-line during a previous monitoring process, as reflected in step 308. Thus, by displaying an indication of available services, while not displaying or highlighting unavailable services, a communication unit 108 becomes a more efficient and valuable tool to a user.

The present invention provides real time service availability information from one or more communication systems/sites directly to a communication unit, within the system service area. The communication unit periodically scans for the service information to provide the user with real time service availability information, thus saving the user time in accessing systems and services that meet their current communication needs.

What is claimed is:

1. A method comprising the steps of in a radio frequency (RF) communication system that provides a plurality of services, wherein each of the plurality of services has a status of either currently available, when the service is presently functional within the RF communication system, or currently unavailable, when the service is presently non-functional within the RF communication system, determining, by the RF communication system, when the status of one of the plurality of services changes from currently available to currently unavailable or when the status of one of the plurality of services changes from currently unavailable to currently available;

transmitting, by the RF communication system on an RF communication resource, information regarding currently available services from the RF communication system;

receiving the information by at least one communication unit;

determining, by the at least one communication unit, from the information the currently available services; displaying, by the at least one communication unit, an indication of the currently available services.

2. The method of claim 1, wherein the determining step further comprises the step of decoding the information such that individual status indicators for the currently available services are translated into data ready for display.

3. The method of claim 1, wherein two or more RF communication systems transmit the information regarding the currently available services on one or more radio frequency communication resources.

4. A method comprising the steps of:

in a radio frequency (RF) communication system that provides a plurality of services, wherein each of the plurality of services has a status of either currently available, when the service is presently functional within the RF communication system, or currently unavailable, when the service is presently non-functional within the RF communication system, determining, by the RF communication system, when the status of one of the plurality of services changes from currently available to currently unavailable or when the status of one of the plurality of services changes from currently unavailable to currently available;

transmitting, by the RF communication system on an RF communication resource, information regarding currently available services from the communication system;

scanning the RF communication resource for the information by at least one communication unit;

determining, by the at least one communication unit, from the information the currently available services;

displaying, by the at least one communication unit, an indication of the currently available services;

determining, by the at least one communication unit, when to rescan the RF communication resource;

rescanning, by the at least one communication unit, the RF communication resource for new information;

determining, by the at least one communication unit, from the new information new currently available services;

displaying, by the at least one communication unit, an indication of the new currently available services.

5. The method of claim 4, wherein the currently available services are stored in the at least one communication unit.

6. The method of claim 4, wherein the new currently available services are stored in the at least one communication unit.

7. The method of claim 4, wherein the step of determining when to rescan further comprises the step of waiting a predetermined time between rescan steps.

8. The method of claim 7, wherein the predetermined time is a function of how many radio frequency communication systems are to be scanned.

9. The method of claim 7, wherein the predetermined time is a function of current activity level in the radio frequency communication system.

10. The method of claim 4, wherein the step of determining when to rescan further comprises the step of rescanning when a user of the at least one communication unit indicates a rescan is desired.

11. The method of claim 4, wherein the step of determining when to rescan further comprises the step of rescanning when the at least one communication unit is activated with a new service.

12. The method of claim 4, wherein two or more radio frequency communication systems transmit information regarding currently available services on one or more radio frequency communication resources.

13. A method for use by a communication unit for use in a radio frequency (RF) communication system that provides a plurality of associated services, wherein each of the plurality of associated services has a status of either currently available, when the service is presently functional within the RF communication system, or currently unavailable, when the service is presently non-functional within the RF communication system, the method comprising the steps of:

monitoring a radio frequency (RF) communication resource sourced by a RF communication system;

when activity is detected on the RF communication resource determining what services are associated with the RF communication system, based on the services currently used on the RF communication resource;

assuming that the associated services have a status of currently available services;

displaying an indication of services having a status of currently available services.

14. The method of claim 13, wherein two or more RF communication system are monitored on one or more RF communication resources sourced by the two or more RF communication systems.

15. The method of claim 14, further comprising the steps of:

remonitoring the one or more RF communication resources;

determining if new currently available services are on-line that were not on-line during a previous monitoring step;

displaying an indication of the new currently available services.

* * * * *